United States Patent
Mueller et al.

(10) Patent No.: US 8,222,911 B2
(45) Date of Patent: Jul. 17, 2012

(54) LIGHT-ASSISTED TESTING OF AN OPTOELECTRONIC MODULE

(75) Inventors: Bernhard Gunter Mueller, Finsing (DE); Ralf Schmid, Poing (DE); Matthias Brunner, Kirchheim (DE)

(73) Assignee: APPLIED MATERIALS GmbH, Dresden (DE)

(*) Notice: Subject to any disclaimer, the term of this patent is extended or adjusted under 35 U.S.C. 154(b) by 818 days.

(21) Appl. No.: 12/296,055

(22) PCT Filed: Apr. 4, 2007

(86) PCT No.: PCT/EP2007/003063
§ 371 (c)(1),
(2), (4) Date: Jan. 28, 2009

(87) PCT Pub. No.: WO2007/115774
PCT Pub. Date: Oct. 18, 2007

(65) Prior Publication Data
US 2009/0179656 A1    Jul. 16, 2009

(30) Foreign Application Priority Data
Apr. 4, 2006 (DE) .......................... 10 2006 015 714

(51) Int. Cl.
*G01R 31/305* (2006.01)
(52) U.S. Cl. ........................... 324/754.22; 324/754.23
(58) Field of Classification Search .................... None
See application file for complete search history.

(56) References Cited

U.S. PATENT DOCUMENTS

| | | | |
|---|---|---|---|
| 4,902,967 A | | 2/1990 | Flesner |
| 5,150,043 A | * | 9/1992 | Flesner ................ 324/750.14 |
| 5,943,125 A | | 8/1999 | King et al. |
| 5,982,190 A | * | 11/1999 | Toro-Lira ............... 324/754.22 |
| 6,396,299 B1 | | 5/2002 | Hayashida |
| 6,593,152 B2 | * | 7/2003 | Nakasuji et al. ............... 438/14 |
| 2003/0213893 A1 | | 11/2003 | Nagahama et al. |
| 2004/0223140 A1 | | 11/2004 | Shonohara |

FOREIGN PATENT DOCUMENTS

| | | |
|---|---|---|
| EP | 0523594 | 1/1993 |
| EP | 0985141 | 3/2000 |
| JP | 01 292736 | 11/1989 |
| WO | WO-2004109375 A1 | 12/2004 |

OTHER PUBLICATIONS

First Office Action dated Feb. 16, 2011 for Chinese Application No. 2007-80020797.
International Search Report. Sep. 8, 2007.
German Office Action issued Nov. 13, 2009 in Application No. 10 2006 015 714.1-51.
International Search Report. Nov. 27, 2008.

* cited by examiner

*Primary Examiner* — Paresh Patel
(74) *Attorney, Agent, or Firm* — Patterson & Sheridan, LLP

(57) ABSTRACT

The present invention relates to a device for testing an optoelectronic module, comprising a first source for generating an electromagnetic beam or particle beam, a second source for illuminating the optoelectronic module; and a detector. In addition, a method for testing an optoelectronic module is provided comprising illuminating the optoelectronic module, directing an electromagnetic beam or particle beam and detecting defects in the optoelectronic module. The illumination additional to the electromagnetic beam or particle beam makes defects visible which otherwise would not be detected.

24 Claims, 12 Drawing Sheets

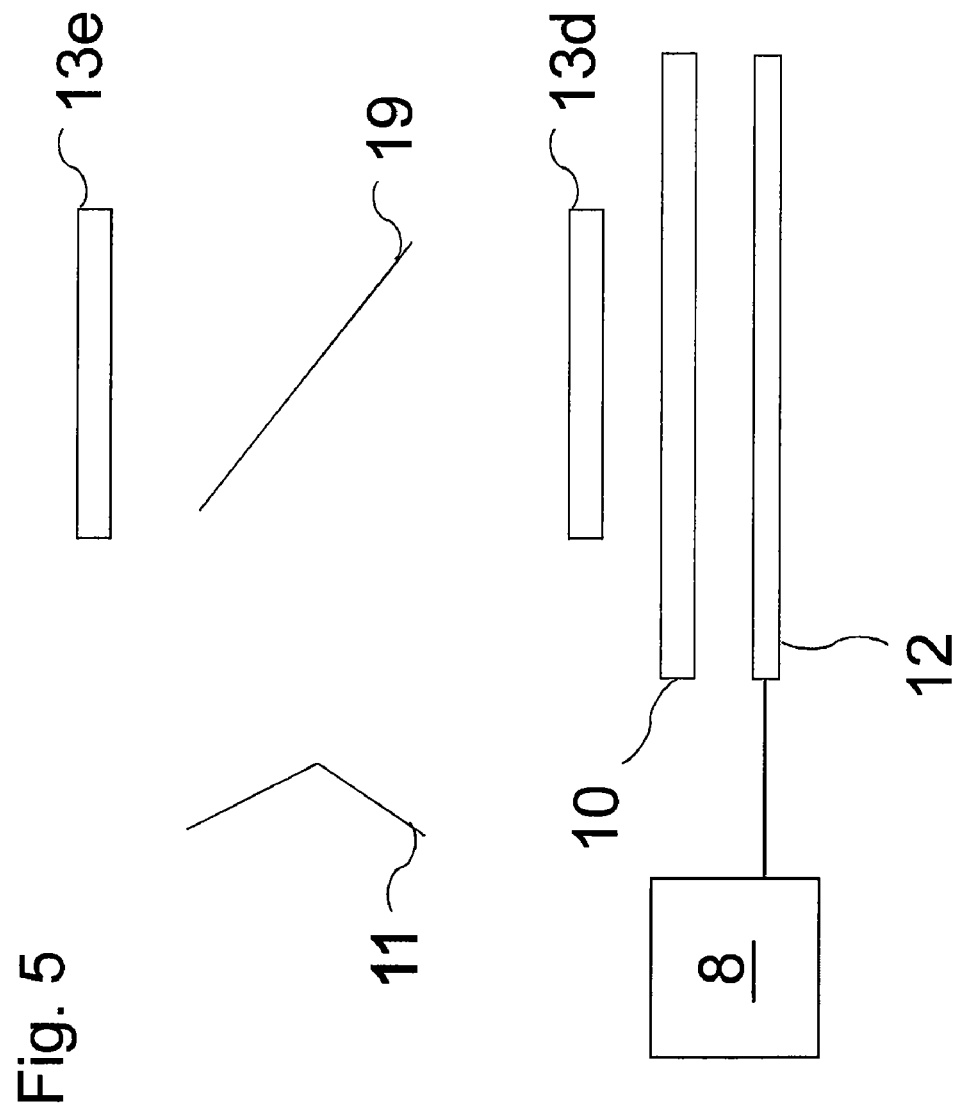

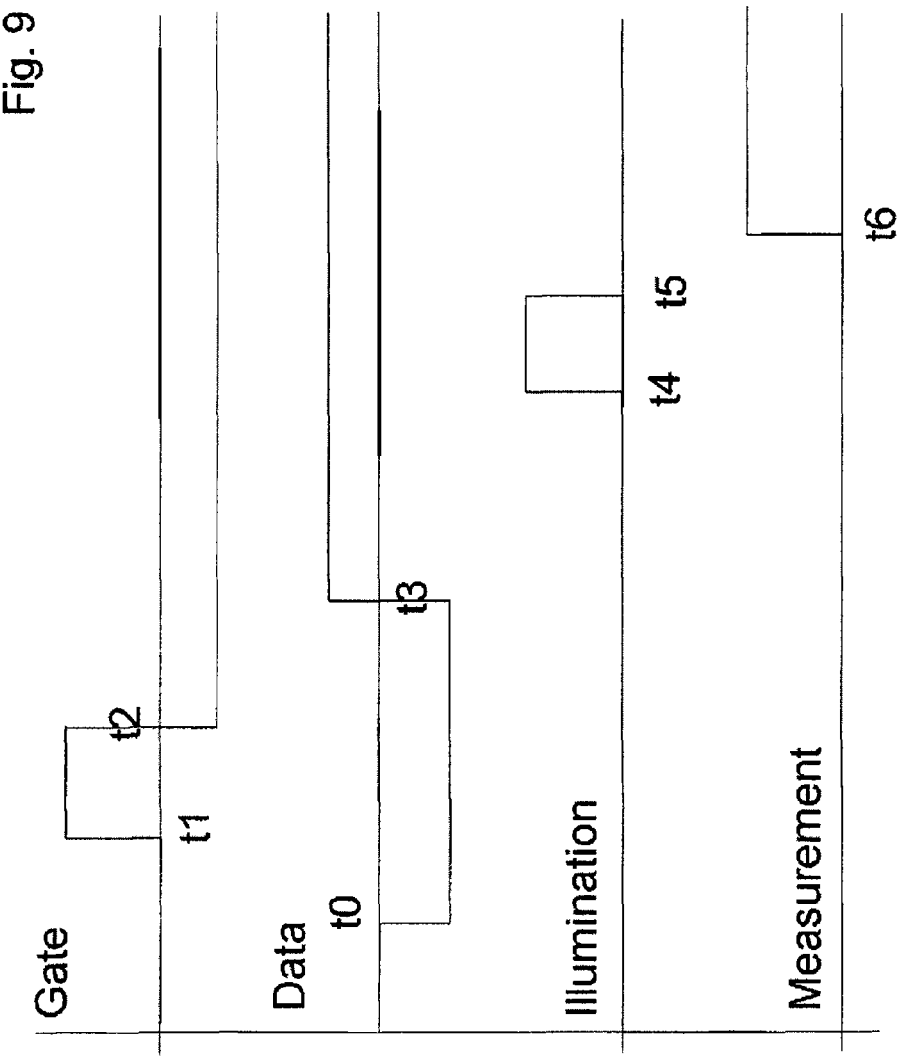

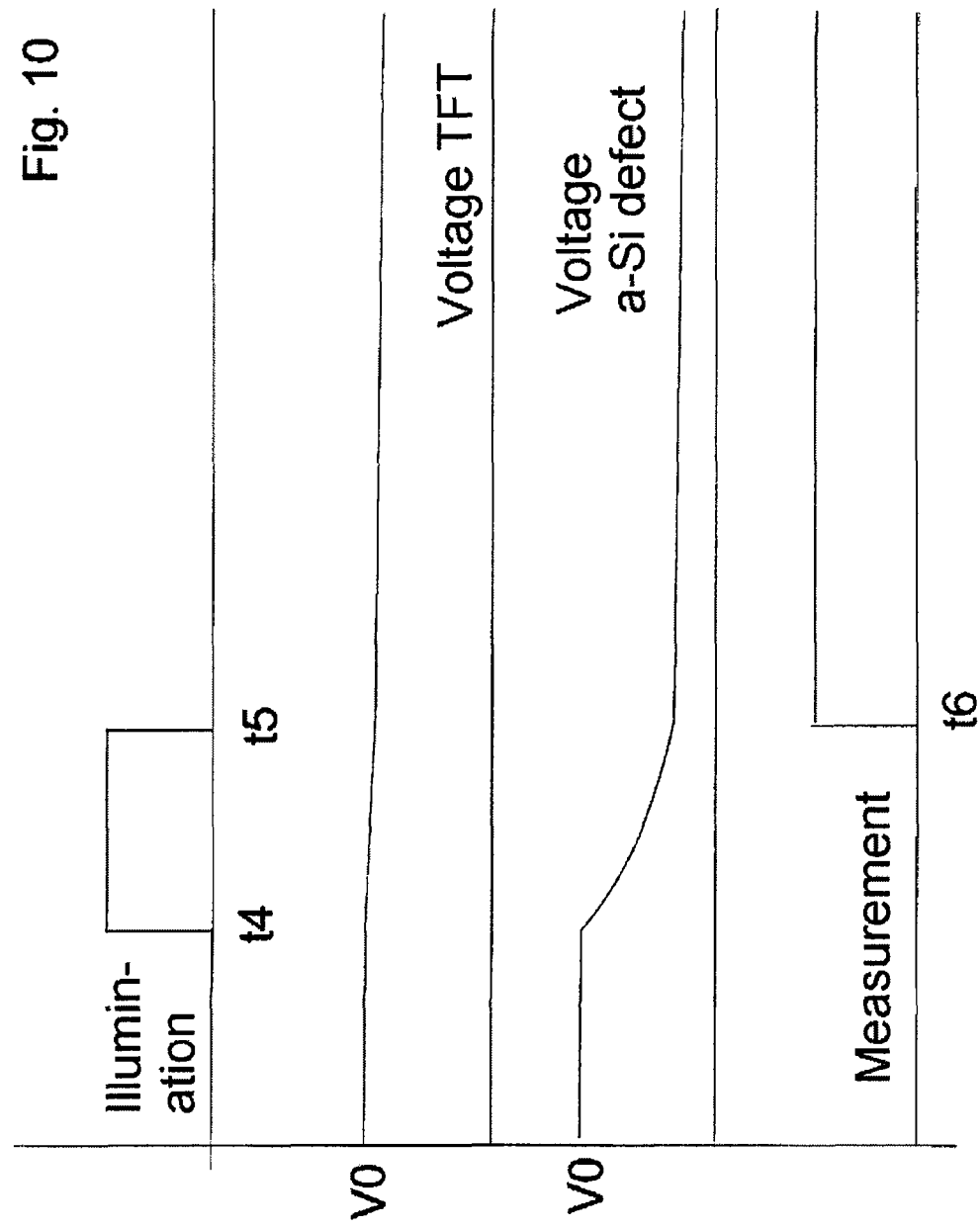

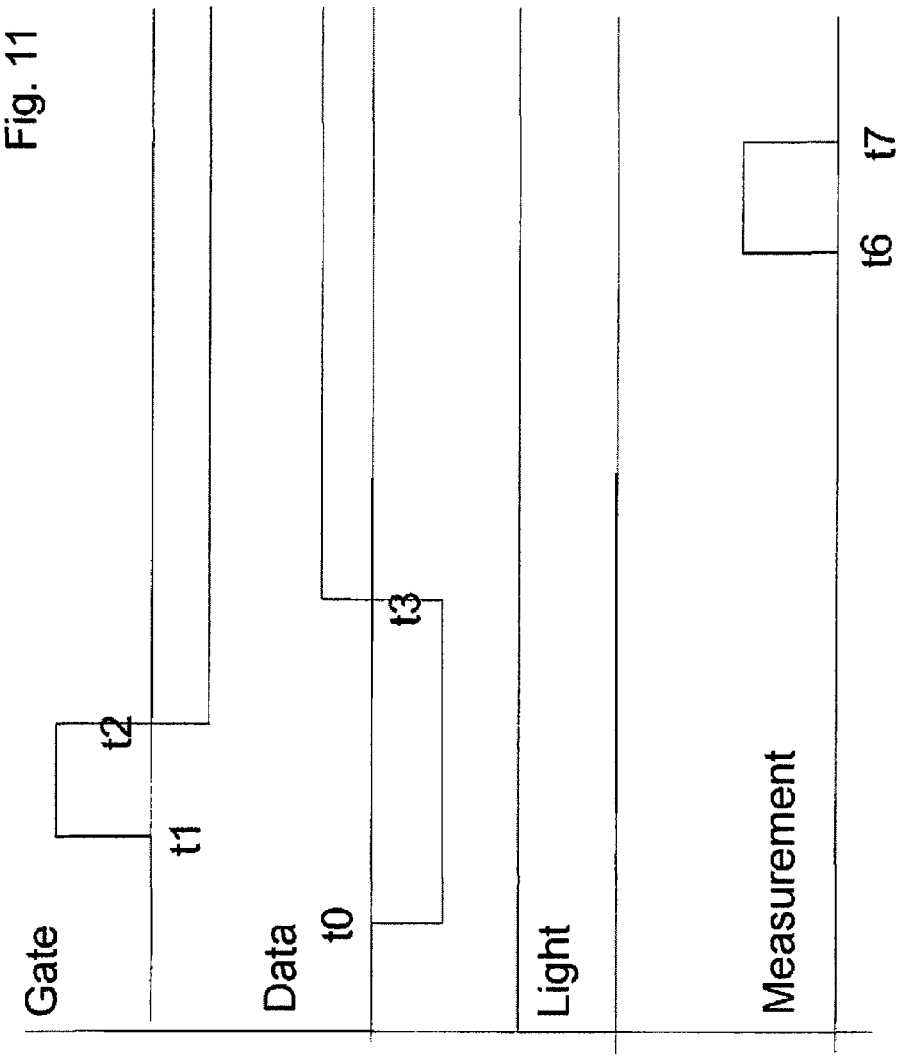

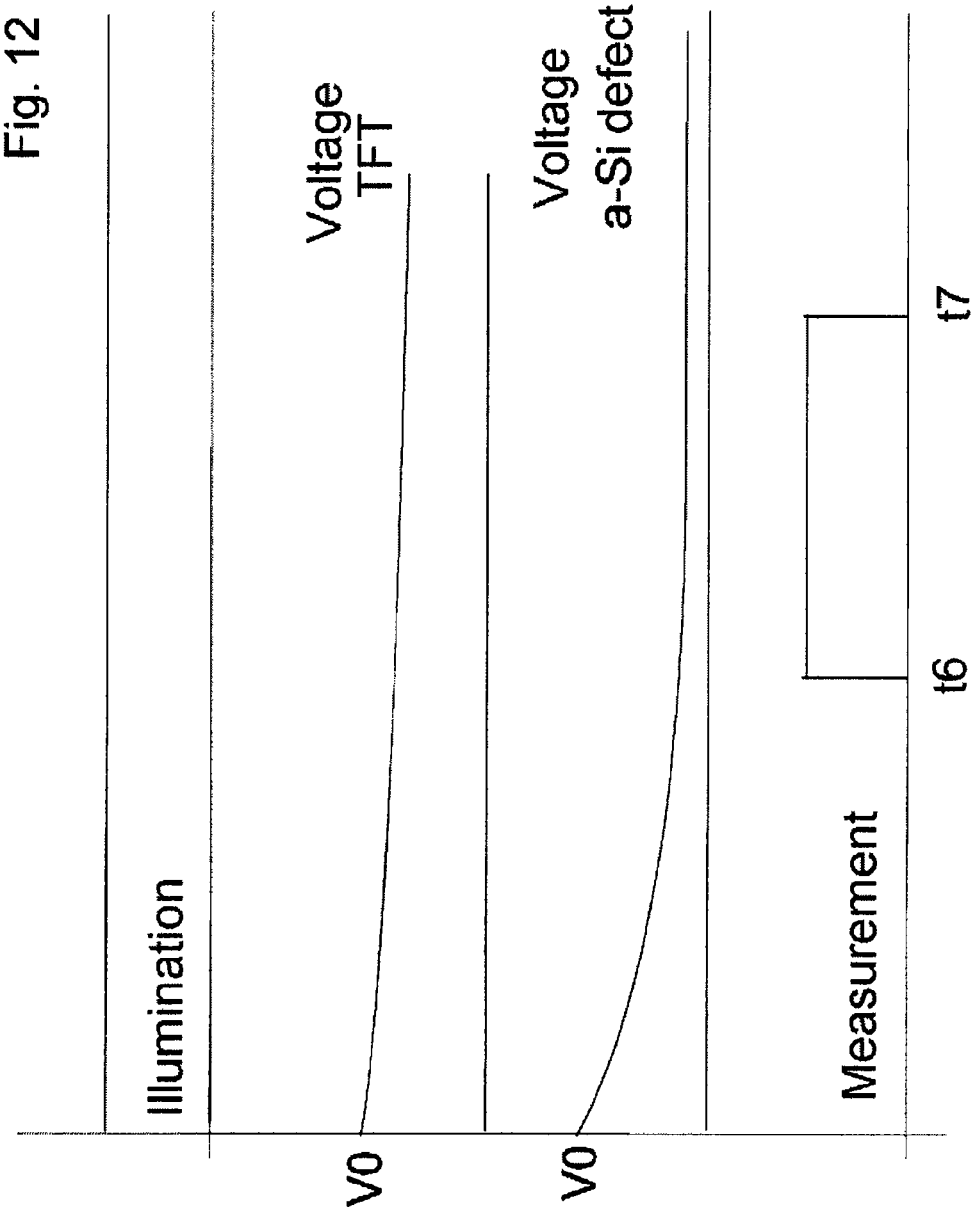

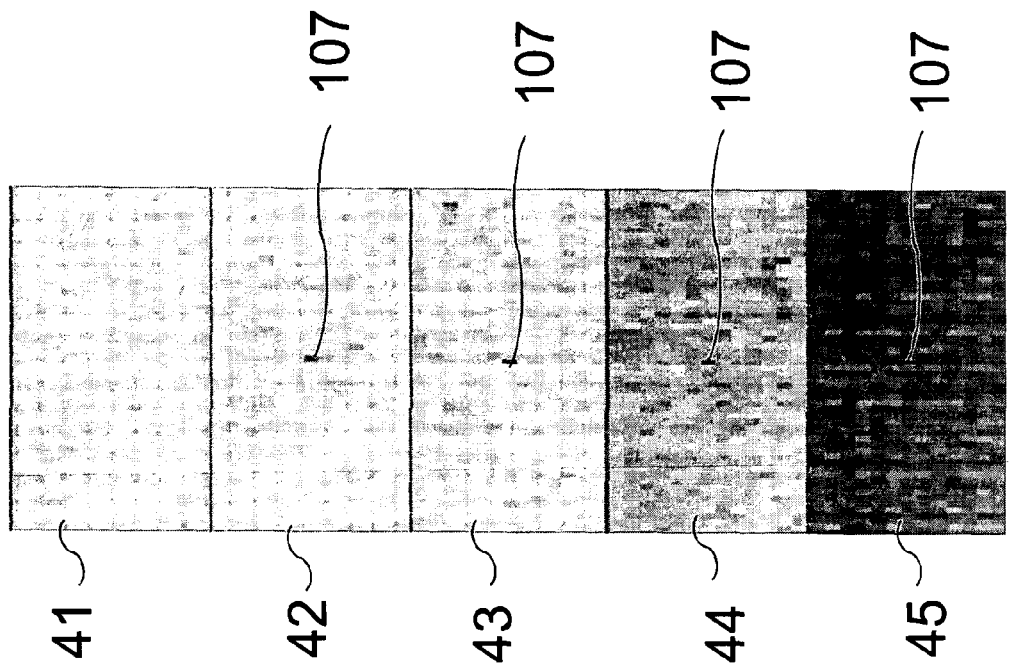

LIGHT-ASSISTED TESTING OF AN OPTOELECTRONIC MODULE

Figure 1:
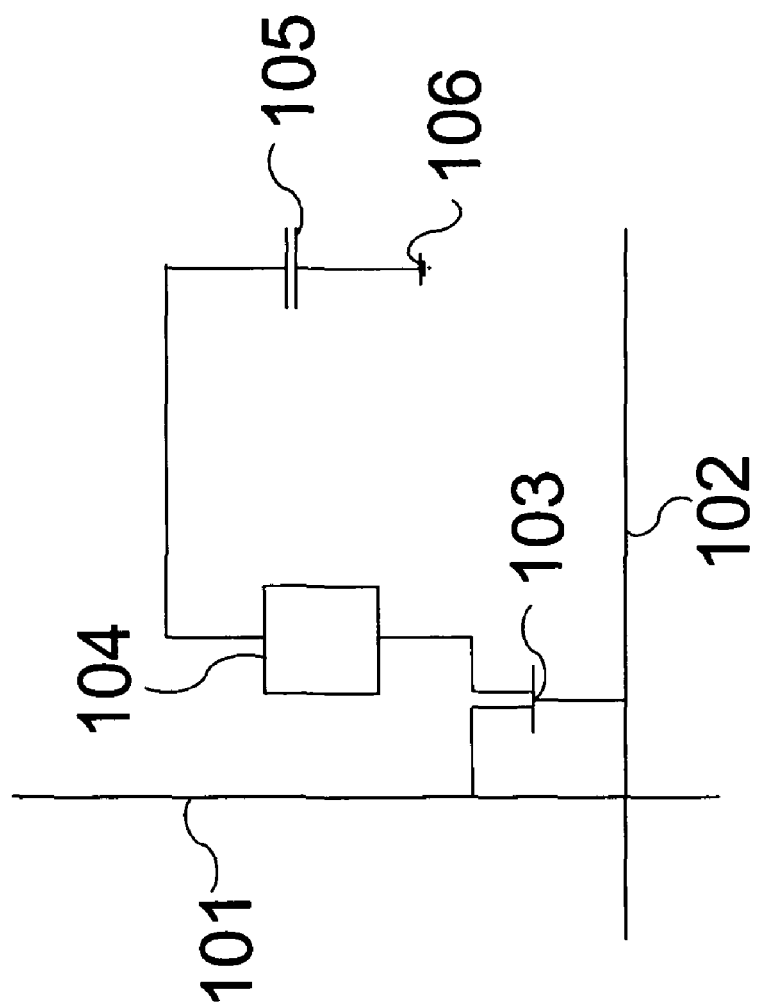

The present invention relates to a method for testing an optoelectronic module and a device for testing an optoelectronic module. The present invention relates in particular to a method for detecting faulty elements of an optoelectronic module and a device for detecting faulty elements of an optoelectronic module. In this case, the optoelectronic module in particular has the form of a display element.

With the increasing demand for screen elements without cathode ray tubes, requirements for liquid crystal displays (LCDs) and other display elements using switching elements such as, for example, thin film transistors (TFT) are increasing. In these display elements the image points are arranged in a matrix form. "Image point" should be understood within the scope of the present application as the complete RGB pixel which is typically composed of three pixels. In this case, each of the three pixels is responsible for one of the three primary colours, namely red, green and blue Pixel is to be understood within the scope of the present application as a unit of an optoelectronic module which comprises a thin film transistor, an electrode pair and a capacitor.

The switching elements of each pixel are usually driven via control lines, i.e. gate lines and data lines. To ensure good picture quality of the display elements, none or only a very few of the several million pixels, for example, may be defective. In order to ensure cost-effective production, it is therefore important to provide high-performance online testing methods primarily for the display elements which are becoming increasingly larger. In these testing methods the individual pixels are frequently tested with a corpuscular beam. The corpuscular beam can either be used to detect the charge applied via the supply lines and/or to apply charge to a pixel electrode.

The testing of optoelectronic modules frequently takes place in such a manner that a certain voltage pattern is applied to all the pixels via the gate and data lines. The individual pixels are then irradiated, for example, by means of an electron beam and the secondary electrons produced are measured. The measurement is assisted by a counter-potential arranged between the surface to be tested and a detector, which allows low-energy secondary electrons to be filtered and thus information to be obtained on the energy distribution of the secondary electrons. Depending on the voltage applied to the pixels, there is a typical energy range of the secondary electrons. Larger deviations from this mean that the driven pixel has a fault which, for example, results in the secondary electrons being emitted from this pixel being too slow to overcome the counter-field applied before the detector. The defect and the position of the defect is stored within the scope of a reporting system. Depending on the optoelectronic module, the defect can be rectified on the basis of this information.

It has been shown that certain types of defects cannot be detected by testing methods in the prior art, such as for example the testing method described in the preceding paragraph. An example of such a defect is amorphous silicon which, for example, in a lithography step, was not completely removed from regions which should in fact be completely unmasked during the etching. The amorphous silicon defect formed in the lithography step can have the result that during regular operation of the optoelectronic module to be tested, the corresponding pixel is short-circuited and thus always generates the same polarisation depending on the applied signals at the gate and data lines. The pixel is therefore defective and must be repaired. If too many pixels are defective it is no longer economical to repair the optoelectronic module to be tested. It is therefore the object of the present invention to provide a method and a device for testing optoelectronic modules which overcomes the problems in the prior art. It is in particular the object of the present invention to provide a method and a device for testing optoelectronic modules, wherein the method and the device are suitable for locating defects in the optoelectronic modules to be tested which could not be located or only incompletely located in the prior art.

The object is achieved at least partly by the devices and methods according to the independent claims. Further advantages, features, aspects and details of the invention can be seen from the dependent claims, the description and the accompanying drawings.

According to the invention, a device for testing an optoelectronic module is provided comprising a first source for generating an electromagnetic beam or particle beam, a second source for illuminating the optoelectronic module and a detector.

Typically the first source is used to obtain test results and the second source is used to make a defect measurable. In other words, this means that the measurement as such is made by means of the radiation or the particles of the first source whilst the second source causes a change in the material to be measured so that defective pixels can be measured which would not be distinguished from the defect-free pixels without the radiation of the second source. Typically, the second source is formed and positioned such that the illumination incident on the optoelectronic module has a substantially homogeneous intensity within an area comprising a plurality of pixels of the optoelectronic module. "Substantially" in this context means that deviations of less than 15%, typically less than 10% can occur. The plurality of pixels is typically between 50×50 and 1000×1000 such as, for example, 500× 500. The area within which homogeneous illumination takes place is typically the test area in which all the pixels can be checked by deflecting the beam of the first source. The area can, for example, comprise a region between 200 mm×200 mm to 600 mm×600 mm.

The second source typically comprises at least one LED. An LED is a light emitting diode. The LEDs can be equidistant from one another.

The optoelectronic module typically comprises a module which is an element of a (colour) screen and can be used as a screen for personal computers, portable computers, television apparatus etc. Liquid crystals and colour filters are not generally contained in the optoelectronic module. The transistors typically comprise so-called thin film transistors (TFT). One or more thin film transistors as well as one or more electrode pairs are typically provided per pixel in a finished screen. Furthermore, one or more capacitors can be provided per pixel. The capacitor is normally used so that the voltage at the liquid crystal does not decay immediately when the corresponding transistor is switched off. Typically, the entirety of all the pixels together with liquid crystals form an LCD. Other elements of the LCD can be colour filters as well as the screen cover plate. In typical embodiments the optoelectronic module is the base plate of a screen, the base plate comprising a plurality of thin film transistors, a plurality of electrodes and a plurality of capacitors. Liquid crystals are typically not contained in the optoelectronic module to be tested according to the invention.

The second source is typically located between the optoelectronic module to be tested and the first source. In addition, embodiments are also feasible in which the first source is located between the optoelectronic module and the second source or in which the two sources are located at one height. It is also feasible that the two sources are mounted in a common holder.

Typically, large optoelectronic modules are tested such that the device for testing comprises at least two first sources, at least two second sources and at least two detectors. In other words, this means that parallel testing is possible. Applications in which at least 10,000 pixels are contained on the optoelectronic module are also found. Typically, the optoelectronic module to be tested according to the invention comprises at least one million pixels.

Typically, the second source provides light at a wavelength of at most 800 nm. In other typical embodiments, the second source provides light with a wavelength of at least 400 nm, typically of at least 550 nm.

According to a further aspect of the present invention, a method is provided for testing an optoelectronic module comprising:
a. illuminating the optoelectronic module;
b. directing an electromagnetic beam or particle beam; and
c. detecting defects in the optoelectronic module.

The illumination additional to the directing of the electromagnetic beam or particle beam makes defects visible which would not be detected without illumination.

The detection typically only takes place within a time interval in which the voltage applied to a defect-free thin-film transistor of the optoelectronic module has dropped to at most 80% or 60%. The electromagnetic beam or particle beam is typically directed onto the optoelectronic module or onto a detector unit. Typically the voltage is measured at least one pixel of the optoelectronic module. An average voltage is calculated on the basis of the voltage at a plurality of pixels and the measurement of the voltage of each pixel is compared with the average voltage. A pixel is then classified as defective if the measured voltage deviates by more than one limiting percentage from the average voltage. Typical limiting percentages are between 20% and 40%, in particular between 25% and 35% such as for example 30%. The illumination preceding the end of the measurement should typically only take place for a time interval in which the voltage at a defect-free thin-film transistor of the optoelectronic module has dropped by no more than 20% or 30%, at most 50%. The illumination can either be completed when the measurement starts or the illumination can be continued during the measurement.

The testing can take place in a vacuum chamber. The device according to the invention can contain one or a plurality of vacuum chambers. The vacuum chambers of the plurality of vacuum chambers can typically provide different levels of vacuum. This means that at least the beams of the first source are guided into a vacuum chamber. The detector is typically also arranged in the vacuum chamber. Alternatively, it is also possible for testing to be carried out in an open environment. In particular, the light of the second source can comprise room light.

Figure 2:
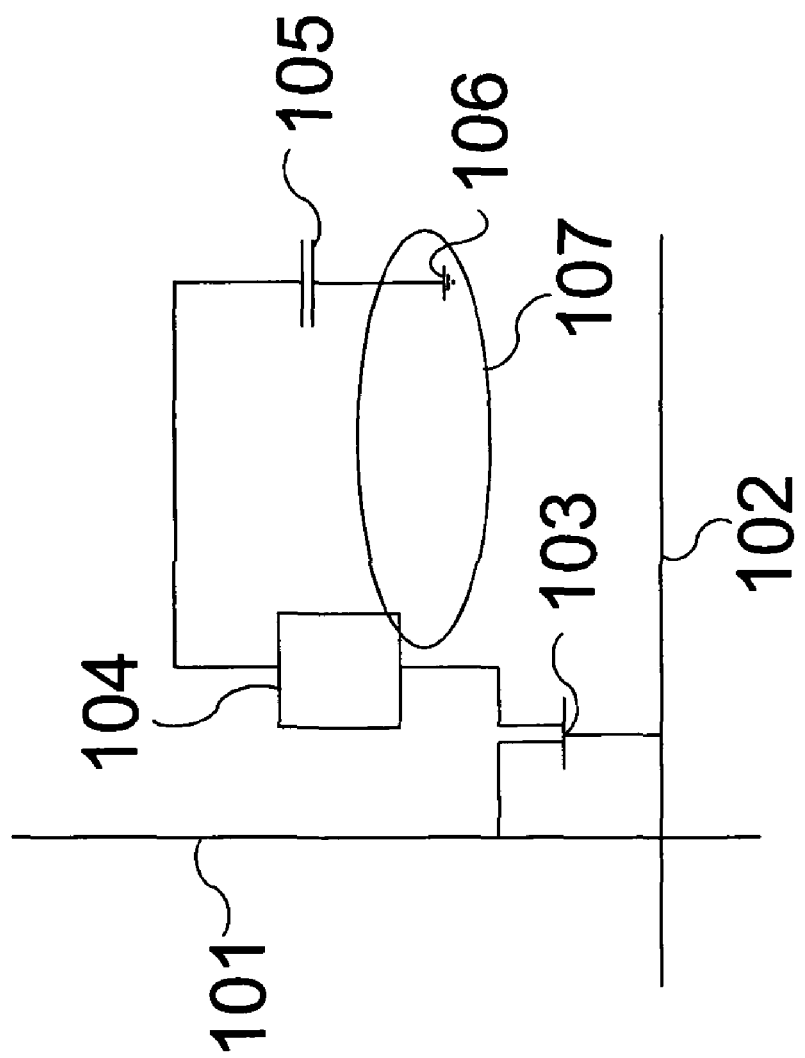
Figure 3:
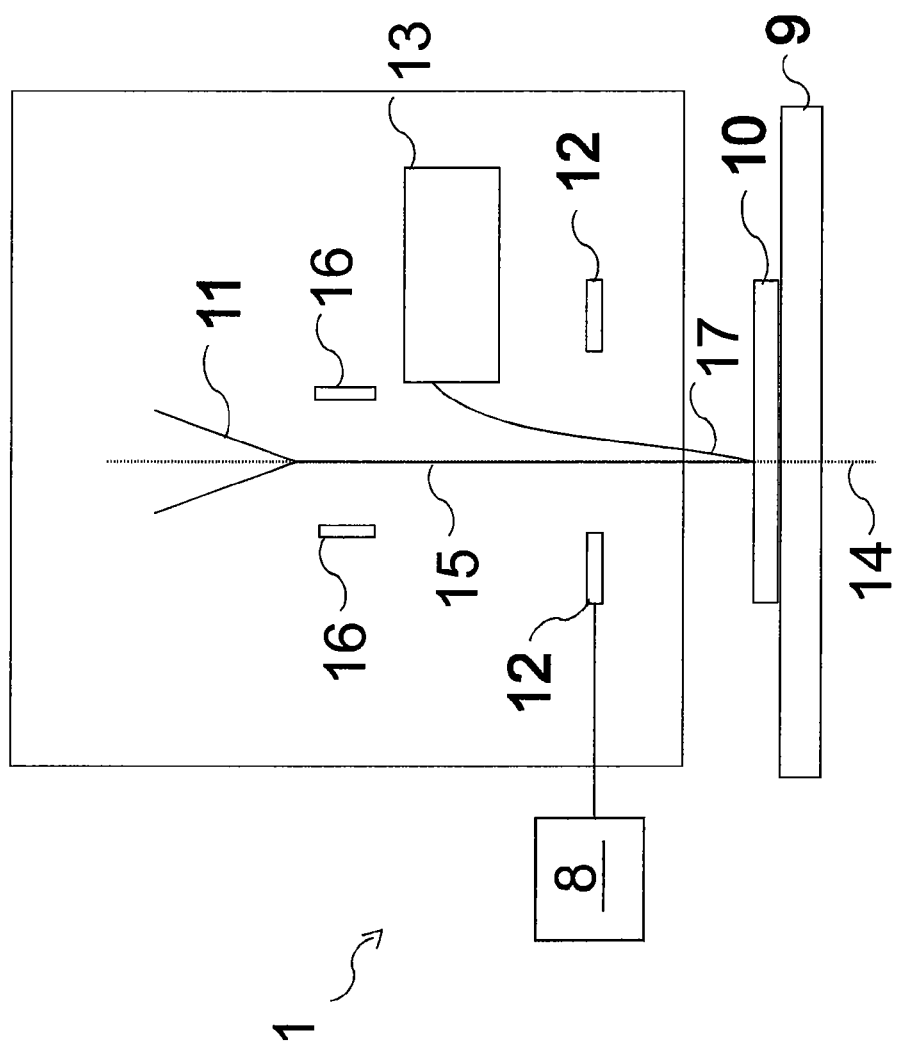
Figure 4:
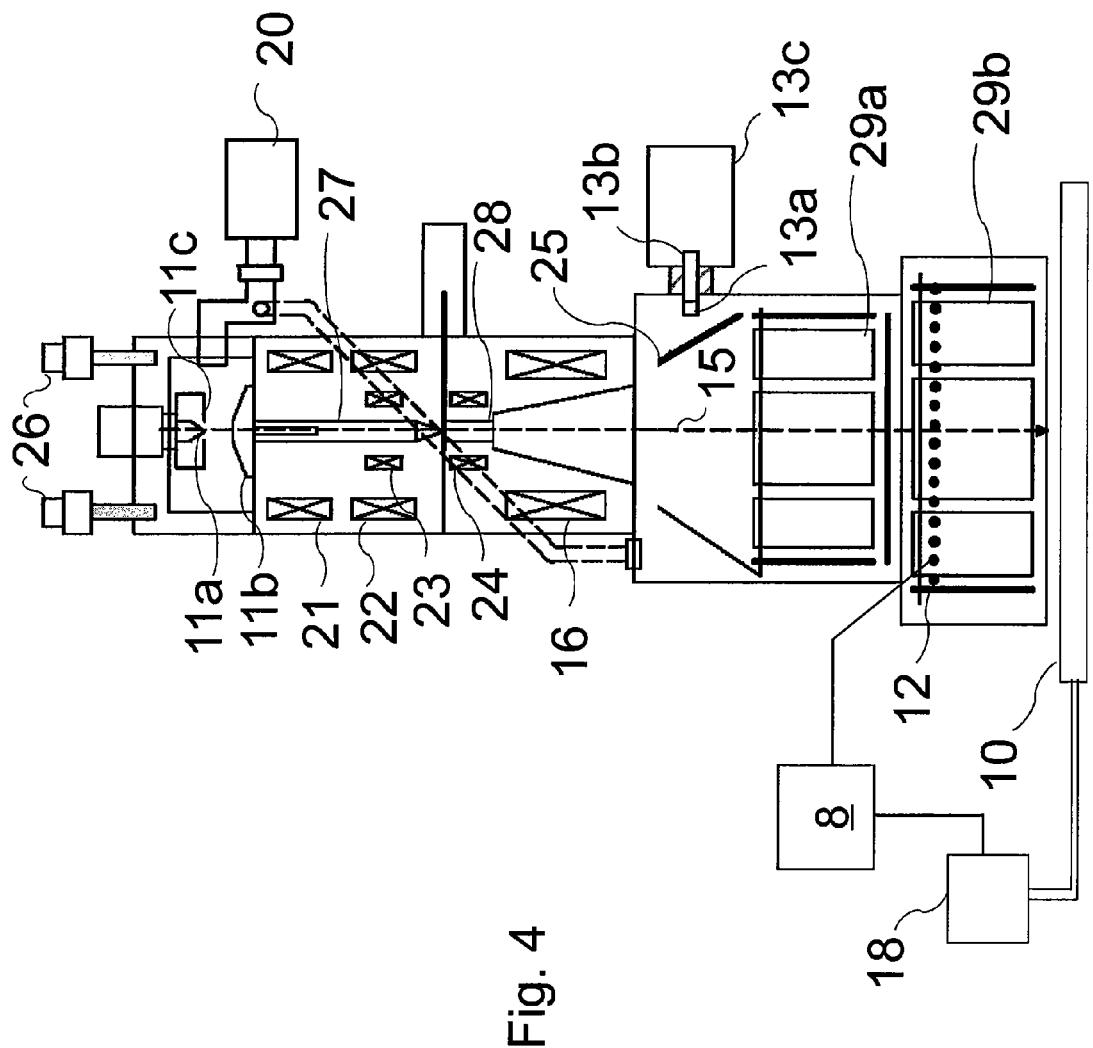
Figure 6:
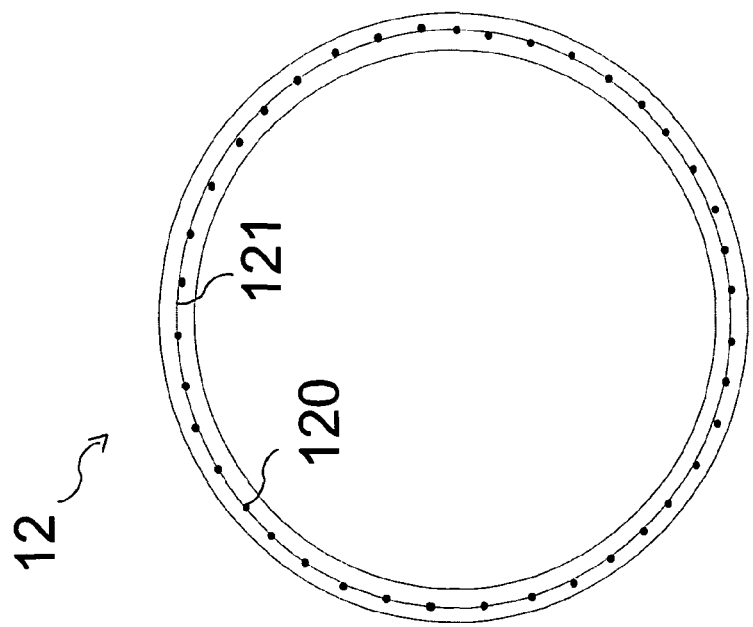
Figure 8:
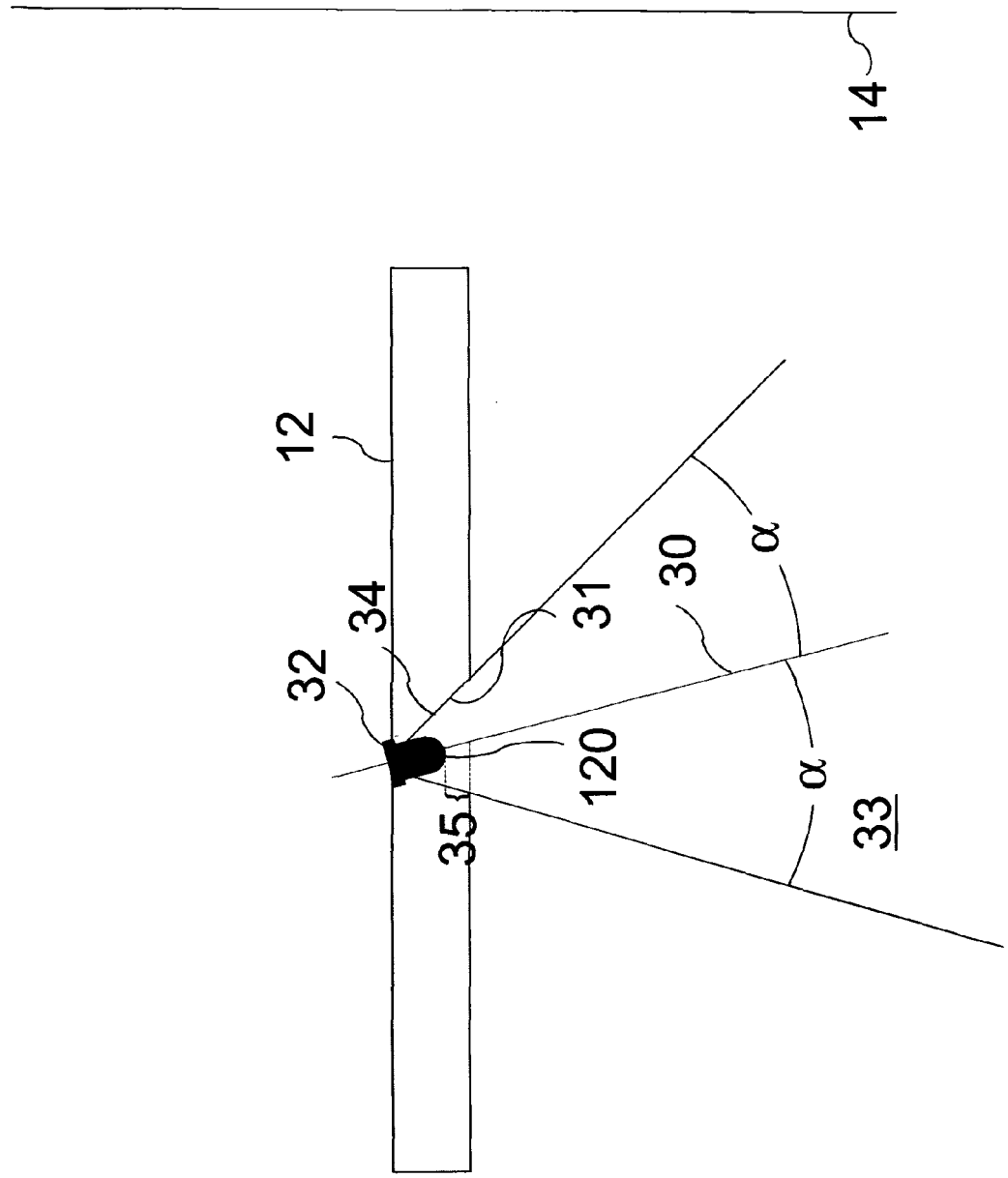

The invention is explained hereinafter as an example with reference to the accompanying figures. In the figures:

FIG. 1: is a exemplary pixel from an optoelectronic module;

FIG. 2: is an exemplary defective pixel from an optoelectronic module;

FIG. 3: is a first embodiment of the present invention;
FIG. 4: is a second embodiment of the present invention;
FIG. 5: is a third embodiment of the present invention;
FIG. 6, 7: are two possible embodiments of the second source;
FIG. 8: is a cross-section through a section from FIG. 6;

FIG. 9, 11: are time-signal diagrams for two embodiments of the testing according to the invention;

FIG. 10, 12: is a diagram of the voltage drop in a defect of amorphous silicon and a thin-film transistor under short or persistent illumination; and FIG. 13: gives results of measurements as a function of the illumination time preceding the measurement.

FIG. 1 shows an exemplary pixel from an optoelectronic module. The electrodes 104 are driven by a logic (not shown) via the data line 101 and the gate line 102. That is, if a signal is applied to the gate line 102 which switches the thin film transistor 103 to conducting and a data signal is also present at the data line 101, a voltage is applied to the electrodes 104 of the pixel which typically causes the molecules to align in a direction other than the direction in which they were aligned without voltage and thus rotate the direction of polarisation of the light transmitted by said molecules through a certain angle. The liquid crystal and colour filter are typically not contained in the optoelectronic module which is tested according to the invention. The structure in FIG. 1 further contains the capacitor 105. A capacitor connected to the electrodes of the liquid crystal is typically used so that the voltage applied by triggering the cell shown does not drop immediately when voltage is no longer present simultaneously at the gate line and data line. The capacitor 105 can, for example, be connected to the gate line of a neighbouring pixel or, as shown in FIG. 1, to earth. Earth is understood in this context as a common position ("common layer") to which the capacitors of all the pixels are connected. This can be earthed. However, there are also embodiments in which it is not earthed but set to a defined typically adjustable value.

FIG. 2 shows an exemplary defect of amorphous silicon which can be detected according to the invention. The optoelectronic module typically comprises silicon and/or amorphous silicon. The amorphous silicon is typically separated to produce the TFT, in which case in the regions outside the transistor it is then removed by a masking step, for example, and a following etching step. It is possible, for example, that the mask is damaged as a result of an impurity or that the etching process as such is not carried out free from error so that residues of amorphous silicon remain outside the TFT. These residues can result in faulty behaviour of the pixel, e.g. since they produce a short circuit when they are illuminated. Frequently, optoelectronic modules, in particular LCD screens in normal operation, comprise a light source which illuminates all the pixels from behind, i.e. from the side facing away from the user, with, for example, white polarised light. The direction of polarisation is rotated depending on the applied voltage at the individual electrodes of the pixel. In this case, the direction of polarisation can be rotated in such a manner that the light cannot pass through the screen cover plate located between the liquid crystal and the user, which is provided with a polarisation filter. In this case, the corresponding pixel remains dark. However, if the pixel has a defect as a result of an amorphous silicon residue, this can have the effect that a short circuit occurs under incident light and the corresponding image point appears always light or always dark regardless of the applied signal.

The fabrication of the transistor 103 comprises, among other things the separation and etching of amorphous silicon. The area in which the amorphous silicon is provided, in particular inside the thin film transistor is masked whereas all the areas outside thereof are not masked. A typical dry-chemical etching step is carried out. In the example shown in FIG. 2 the situation has arisen that after the etching step, the residue 107 of amorphous silicon has remained outside the TFTs. This amorphous silicon is non-conducting as long as no light is incident thereon. If the pixel shown in FIG. 2 is thus tested in the dark using prior-art methods, no defect can be detected and the amorphous silicon behaves as an insulator. However, for the use of the cell in an optoelectronic module the light typically passes through the cell. With increasing light intensity, the amorphous silicon increasingly loses its insulator properties and acquires electrical conductivity. Thus, during operation of the optoelectronic module, the defect 107 shown in FIG. 2 triggers a short circuit between electrode 104 and earth 106 so that the entire pixel shown is defective. The testing of the pixel according to the invention comprises the step of illuminating the pixel with a certain light dose. The amorphous silicon 107 thus becomes conducting and in the example shown, during the test the charge present at the electrode 104 of the pixel applied via the data line 101 and the gate line 102 can flow away directly to earth 106. The defect 107 can thereby be detected (see later for the testing method in detail).

FIG. 3 shows a first embodiment of the device 1 for testing according to the present invention. The device comprises a first source 11 for generating an electromagnetic or corpuscular beam 15. Typically, the generated beam is an electron beam; ion beams are also feasible. Alternatively, electromagnetic beams in particular from the visible spectrum can be used for testing. Even if reference is always made to a device with an electron beam source as an example in this application, this should not be understood as restrictive. The generated beam 15 moves along the optic axis 14. In general, it is possible to concentrate the beam between the source and the optoelectronic module to be tested, in particular to focus, collimate, align, filter, accelerate, brake, deflect and/or correct for astigmatism etc. For this purpose, the device for testing can have one or more of the following elements: optical lens, magnetic lens, electrostatic lens, combined electrostatic-magnetic lens, Wien filter, capacitor, equaliser, collimators, deflectors, accelerators, braking elements, apertures, stigmators etc. In the case of particle beams, the particles can be brought to a high speed after the source by passing them, for example, through accelerating electrodes, and braking them again shortly before they impinge on the optoelectronic module. This has the advantage that interactions between the particles which broaden the beam can be reduced.

As an example, FIG. 3 shows a deflector 16 whereby the beam can be deflected to trigger various points on the optoelectronic module 10 with the beam. In the case of a particle beam, the deflector can generally comprise one or more electrodes or magnetic deflecting coils. In the case of an electromagnetic beam, one or more mirrors or prisms, for example, can be used. A deflector is not absolutely necessary if the various points on the optoelectronic module can be triggered via an exact movement system of the platform 6, whereby the movement system can typically move the optoelectronic module 10 in the x-y plane. The x-y plane is the plane which lies substantially perpendicular to the optic axis of the device for testing. The optic axis is typically defined by the direction of the beam from the first source. All the cells of the optoelectronic module can generally be tested in such a manner that the surface to be tested is initially divided into a plurality of test areas. Using one or more deflectors, all the cells within a test area are irradiated and tested in order, the movement system of the platform not being moved in this time interval. When the test area has been completely tested and the results stored, the movement system displaces the optoelectronic module such that all the cells of a new test area can be irradiated and tested. In this way, the complete optoelectronic module can be tested. In this respect, in view of the increasing sizes of optoelectronic modules, it is especially typical that a plurality of devices according to the invention for testing an optoelectronic module are used in parallel. In other words, in this case, the device according to the invention for testing an optoelectronic module comprises at least two first sources, at least two second sources and at least two detection units. The at least two devices for testing operated in parallel check different, typically adjacent, test areas in test mode. The total test duration for testing one optoelectronic module in the case of n devices for testing operated in parallel is reduced to about 1/n of the time which would be required if only one device was used for testing. The typical size of the test areas is between 20×20-40×40 $cm^2$, in particular around 30×30 $cm^2$. Typically, at least one of the deflectors used is capable of providing a deflection of the beam in any direction by +/−10-20 cm, in particular by +/−15 cm.

The beam 15 in FIG. 3 is directed onto a cell of the optoelectronic module 10 to be tested. The beam 15 impinging upon the optoelectronic module causes secondary particles 17 to be generated and leave the optoelectronic module. The number of secondary particles and the magnitude of their energy provides information on defects within the irradiated cell of the optoelectronic module. The secondary particles are measured using the detector 13. The detector typically comprises a scintillator, a photomultiplier and other units for reading out and evaluating the information obtained. In addition, a counter-potential can typically be applied shortly before the detector. For this purpose, for example, a grid or an electrode ring to which the or a potential can be applied is typically arranged before the detector 13. Depending on the applied voltage, all the secondary particles which cannot overcome the applied potential are filtered. These cause no deflection in the detector. Alternatively, energy filtering can also be carried out using a magnetic field or a combination of a magnetic field and an electric field. Reference numeral 12 represents an annular second source which typically illuminates the optoelectronic module 10 with red or green light. It is generally preferred that the source is shaped and positioned such that the light intensity on the optoelectronic module is constant or almost constant within a complete test area. As a result, identical test conditions are created for all the pixels within the test area. In particular, the TFT as well as the defects, in particular the defects of amorphous silicon, are thereby illuminated with the same light intensity. The conductivity of the TFT thus increases in the same or approximately the same way in all pixels and the conductivity of the defects of amorphous silicon thus increases in the same or approximately the same way in all the pixels. The position of the second source can generally be above the optoelectronic module or below the optoelectronic module, i.e. on the side of the beam source or on the side of the optoelectronic module opposite to said source. In the latter case, the display typically lies on a platform which is transparent for the wavelength of the second source. Furthermore, the second source can also comprise scattered light from the surroundings.

The second source typically provides red light. The light can, for example, have a wavelength between 550 and 800 nm such as, for example, 630 nm. Alternatively or additionally, green light can also be provided by the second source. Both red and green light is suitable for substantially improving the conductivity of amorphous silicon. The secondary particles are typically detected using a detector unit comprising a scintillator and a photomultiplier. The influence of scattered light and reflected light reaching the detector on the photomultiplier can be reduced if red light is produced at the second source.

The optoelectronic module typically comprises contact elements (so-called contact pads) via which electrical contact can be made to a test unit. The device according to the invention typically allows the beam from the first source to be directed onto individual pixels of the optoelectronic module. This means that only an insignificant part of the beam is incident on neighbouring pixels. Insignificant is understood here as a fraction of not more than 20%.

FIG. 4 is a diagram of a second exemplary embodiment of a device for testing according to the present invention. In addition to the elements already known from FIG. 3, numerous other elements, for example, are also shown in this embodiment. However, it is stressed that this is merely an illustrative diagram and the elements from FIG. 4 are in no way absolutely essential for carrying out the invention. Merely the features specified in the independent claims of the present application are necessary for carrying out the present invention.

FIG. 4, like FIG. 3, shows a device for testing where the first source is a particle beam source. The first source 11, comprising a cathode 11a and an anode 11b, generates a beam 15 of particles, for example, of electrons. The anode can at the same time function as a diaphragm. A grid 11c which lies at a certain potential can be arranged in front of the cathode 11a. The beam initially moves in a channel 27, the so-called "liner tube" towards the optoelectronic module 10. Shown as an example between the anode and the optoelectronic module are a condenser lens 21, two other lenses 22 and 23 comprising a projective and focusing lens, the stigmator 24, the electrostatic deflector 28 and the magnetic deflector 16. The stigmator is used to eliminate astigmatic errors in a beam. One deflector is typically used for fine deflection and another deflector is used for coarse deflection. In the present example, the electrostatic deflection is used for fine deflection whereas the magnetic deflection is responsible for the main deflection. The fine deflection can be carried out very rapidly as a result of using an electrostatic deflector. The second light source 12 is represented as a ring of LEDs (light emitting diodes) wherein the ring is generally arranged and not restricted to the present embodiment in such a manner that the optic axis forms the centre point of the ring. Located shortly before the detector is a conductive grid 25 to which a voltage can be applied. In general, any type of spectrometer or energy filter can be provided instead of the grid. In other words, the device according to the invention for testing optoelectronic modules can comprise means for energy filtering of secondary particles. The detector from FIG. 4a consists of a scintillator 13a, a photomultiplier 13b and a light detector 13c. Not shown in FIG. 4 is the logic for evaluating the signals received in the detector. Such a logic is typically connected to the test unit (not shown) which applies a certain voltage pattern to the optoelectronic module as well as means for energy filtering of the secondary particles such as, for example, the grid 25 in FIG. 4.

FIG. 4 furthermore shows stepping motors 26 for mechanical alignment of the cathode and the vacuum pump system 20 which is responsible for generating a vacuum inside the device for testing. The pump system can possibly comprise a plurality of suction connections which are attached to the device for testing according to the invention. In the example in FIG. 4, the pump system comprises two suction connections. In addition, it is possible to produce vacua of different levels in different chambers of the device according to the invention. The optoelectronic module is connected to the test unit 18 which applies voltage to the data and gate lines of the optoelectronic module according to the test pattern used. The platform is not shown in FIG. 4.

Octopole plates 29a and 29b are furthermore shown in FIG. 4. The octopole plates 29b are provided with a static potential for producing an extraction field. The secondary electrons are thereby accelerated upwards. This is also known under the term "collection" of the secondary particles. The second source 12 can be formed and mounted such that it assists the collection in the event of a voltage applied hereto. The octopole plates 29a are driven dynamically depending on the primary beam. They are used to accelerate the secondary elements to the detector 13a-c. It is stressed, however, that these octopole plates are not absolutely necessary for carrying out the testing according to the invention. The octopole plates 29b are exemplary embodiments of a static detection unit and the octopole plates 29a are exemplary embodiments of a dynamic detection unit. Such detection units can generally be contained in embodiments of the device according to the invention.

FIG. 5 shows another embodiment of the present invention. In the embodiment according to FIG. 5, the optoelectronic module 10 to be tested is illuminated from below with the light from a second source 12. From above the electromagnetic radiation emanating from the source 11 is directed onto the lower detector 13d, where a deflection of the beam direction using a prism 19 is shown as an example. The radiation from the first source can, for example, be light from the visible spectrum. The detector 13d, 13e tests the optoelectronic module for defects. The lower detector 13d can, for example, comprise crystals which react with different intensity to the electric field strength acting upon them. In this case, the detector for testing is brought into close proximity to the optoelectronic module, the distance between the optoelectronic module and the detector typically being of the order of magnitude of $10^1$ μm such as, for example, 30 μm. The crystals react differently depending on the applied voltage. This different reaction can be read off an upper detector 13e by means of the light from the first source returned from the lower detector 13d. The light from the source 12 can also comprise ambient light in the room.

Figure 7:
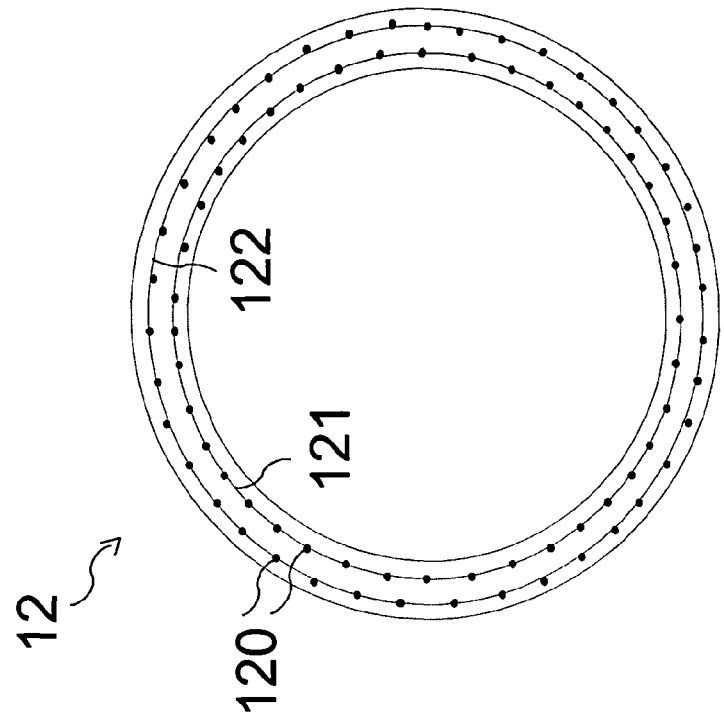

FIGS. 6 and 7 show two exemplary embodiments of the second source 12. FIG. 6 shows an arrangement of LEDs 120 having the form of a ring 121. FIG. 7 shows an arrangement of LEDs 120 having the form of an inner ring 121 and an outer ring 122. The second source typically comprises a plurality of individual point light sources. A typical point light source is an LED. In addition, the point light sources typically comprise the end pieces of a glass fibre connection to a common light source. It is also typical to use a flat light source such as, for example, a conventional incandescent lamp or neon tube as the second light source. Furthermore, filters, in particular colour filters or diffusers can additionally be attached.

The use of LEDs has the advantage that light of known and substantially uniform wavelength is produced. However, the light of LEDs is also directional. It is therefore typical to arrange a plurality of LEDs such that a luminous intensity having an intensity which is as uniform as possible is produced on the area of the optoelectronic module to be tested. Typically more than 20, 25 or 50 LEDs are arranged. For example, 80 or 100 LEDs can be arranged on a ring. The orientation of the LEDs is substantially perpendicularly directed onto the optoelectronic module. In this case, this substantially means that deviations in the region of up to 20° to 30° are possible. Experiments have shown that a slightly directional arrangement allows a very uniform intensity distribution on the area of the optoelectronic module to be tested. The LEDs are arranged in a ring according to FIG. 6 or FIG. 7, their alignment forming an angle of 14° to the optic axis of the device according to the invention. In general, angles of alignment between 0° and 25° yield good results, in particular angles between 10° and 20°. FIG. 8 shows a section of a second source as an example, the cross-section being shown through one side of the annular arrangement of the plurality of LEDs. The LED 120 shown is secured in the ring in an indentation 31. The indentation has walls 34 which lead away at a defined angle from the root 32 of the LED. As a result, the beam region 33 of the LED 120 is already limited to a defined angular range. Typically, the beam region 33 delimited by the walls 34 has an aperture angle of between 20° and 90°, frequently between 30° and 60°, such as for example 45°. The LED is generally arranged typically in the indentation and not restricted to the present embodiment such that the tip of the LED head is located inside the indentation and does not look out thereover. Typically, the distance 35 between the tip of the LED head and the edge of the second source is a few millimetres, e.g. between ¼ mm and 4 mm, in particular 1 mm. Furthermore, the LED is aligned at an angle of 14° to the optic axis 14 of the device for testing according to the invention. The alignment is indicated by the line having the reference numeral 30. The optic axis 14 which is located at the centre point of the annular second source 12 is also indicated in FIG. 8. The lines characterised by 14 and 30 from FIG. 8 have an angle of about 14°. Angles of 2°, 5°, 10°, 13° and 17° likewise result in good homogeneity in the intensity distribution. With an annular and equidistant arrangement of about 80 LEDs, a ring having a diameter of about 40 cm, and an alignment of about 14° to the optic axis and a distance of about 23 cm between the annular second source and the surface of the optoelectronic module to be tested, an excellent, almost homogeneous light intensity can be produced on the optoelectronic module. However, it is stressed these are only exemplary values and there are numerous other possibilities for producing a high degree of intensity homogeneity on the area of the optoelectronic module to be tested.

The outer material of the LEDs used is typically an insulator. In order to avoid in particular, back-scattered electrons from being able to accumulate on the LEDs and therefore possibly resulting in perturbing fields, means for removing charges can possibly be mounted before the LED. In particular, these can be a conductive network. The material in which the LEDs are mechanically anchored is typically a conductor. As a result, not only charged secondary particles and particles back-scattered by the optoelectronic module can flow away but the second source can also be set at a certain potential which assists the collection of secondary particles (cf. the description to FIG. 4). Typical potentials of the secondary source lie between 0 and −100 V.

FIGS. 9 and 11 show the time profile of two embodiment of the testing according to the invention, where according to the embodiment described in FIG. 9, a short light pulse precedes the measurement and according to the embodiment described in FIG. 11, continuous illumination takes place. FIGS. 10 and 12 show the voltage profile at a defect of amorphous silicon and at a defect-free thin film transistor for the embodiments from FIGS. 9 and 11, in each case. The light from the second source used can in particular comprise all the light sources described previously. The test unit is a circuit known in the prior art at the outputs whereof a plurality of signals of different magnitude can be tapped at different times. The test unit can, for example, be a computer comprising an input unit such as, for example, a mouse and/or a keypad, a display unit such as, for example, a screen, a computing unit such as, for example, a CPU (central processing unit) and a memory unit such as, for example, a non-volatile memory, for example, a hard disk and/or a volatile memory such as, for example, a RAM (random access memory).

FIG. 9 shows the time profile of a testing process. A voltage is applied to the data line by means of the test unit at time to. This is usually shortly before the gate is opened at time t1. Between t1 and t2 the gate is opened and a signal is present at the data line. This process is also known as "driving". At time t2 the gate is closed again by being set to zero potential again, for example, or as shown in FIG. 9, at a negative potential. The latter has the advantage that defects within the gate such as, for example, a short circuit between the gate and data line can be detected. In general, the gate is closed when the applied voltage exceeds the voltage at the data line. Only the signal at the data line is typically varied thereafter, namely at time t3. The driving is completed. At time t3 the data signal can either be set to 0 or switched to a different value than that which was present between t0 and t3. The latter has the advantage that a defect in the transistor which results in said transistor allowing the modified signal to pass despite the transistor actually being blocked, can be detected. After a short waiting time between t3 and t4, in the embodiment from FIG. 9 the optoelectronic module is illuminated with a controlled short light pulse of length t5-t4. Typical light doses of such a light pulse lie between 5 lxs (lux*seconds) and 30 lxs, in particular between 10 lxs and 20 lxs such as, for example, 13 lxs. The light dose used in typically achieved with light having an illumination intensity (1 lx=1 lm/m$^2$) between 500 lx and 2,500 lx, in particular between 1000 lx and 1500 lx such as, for example, 1300 lx. The expression "illumination intensity" relates to the illumination intensity in the plane of the optoelectronic module and not to the illumination intensity at the second source itself. The illumination time can be selected, for example, between 0.001 s and 0.1 s such as, for example, 0.01 s. If the second source is driven for a time interval of 0.01 s at an illumination intensity of 1300 lx, a light does of 13 lxs is obtained. The illumination time interval is typically selected such that the amorphous silicon of the defects is conductive for a sufficient time interval. The time interval is sufficient if the potential previously applied in the pixel can flow over the defect at a strength such that the voltage drop can be detected in the following measurement. This typically means that in the measurement at least 20% or 30% of the charge in the defective pixel should already have drained off. At the same time, the illumination time interval before the measurement according to the embodiment described in FIG. 9 should not be selected to be too long because the charge would then drain off appreciably over the amorphous silicon of the defect-free transistor and thus a defective pixel could no longer be distinguished from a defect-free transistor. The waiting time between t4 and t3 can generally be omitted and then t3=t4 would be achieved. The advantage of a waiting time, however is that the voltage is stabilised somewhat after switching over the data line at time t3 before the illumination is then switched on at time t4. Typical waiting times for the time interval between completion of the driving (t3) and illumination (t4) are between 50-100 µs.

A control unit 8 of the second source 12 is provided for switching on and switching off the second source 12 and/or for synchronizing the second source with an electrical signal applied to the test unit 18 as shown in FIGS. 3-5. If the light source as shown in FIG. 9 is switched off during the measurement, the measurement is not subjected to any time pressure which goes beyond the known time limits from the prior art. Since the voltage in the defect-free pixels also gradually decays without illumination, at a certain time t*>t6, so much charge has drained from all the pixels that no further meaningful measurement results can be achieved. The time t*−t6 is typically of the order of magnitude of 100 s, e.g. between 0.5 s and 5 s. In order to continue testing of the optoelectronic module, a so-called "refresh" must now take place. This means that, insofar as the method for testing has not yet been completed, the description and illumination procedure as shown in FIG. 9, for example, is started anew. That is, the data signal is first opened again (time t0), then a gate voltage (t1) is applied etc. The entire procedure is repeated until all the pixels of the area of the optoelectronic module to be tested or the complete optoelectronic module have been examined for defects.

FIG. 10 shows the voltage drop at a defect-free thin film transistor ("TFT") and a defect of amorphous silicon ("a-Si defect") during and after illumination. Initially, the voltage at the TFT and at the a-Si defect is V0. This corresponds to the voltage which has been established after driving. Without light the voltage decreases only very slowly and on the scale shown in FIG. 10, this can barely be identified. If the illumination is switched on at time t4, a significant voltage drop takes place in the s-Si defect as far as time t5, i.e. as long as the illumination is directed onto the optoelectronic module. A voltage drop can also be identified in the transistor but this is significantly less marked that the voltage drop in the defect of amorphous silicon. After switching off the illumination, i.e. after t5, the voltage in the TFT and in the a-Si defect decreases only very slowly. The slow drop is caused by the leakage currents which are always present.

For the measurement this means that the voltage in one pixel having an a-Si defect can be clearly distinguished from the time t5 from the voltage in a pixel containing no defect and the voltage drop is merely caused by the defect-free transistor. At a later time which can be several seconds after t5 or t6, as a result of the known leakage currents in the TFT which cannot be prevented, the voltage in the TFT has dropped to such a low value that the difference from the voltage in a pixel having an amorphous silicon defect is no longer sufficiently clear. In this case, a refresh must take place to continue the measurement. The time of the measurement t6 can generally coincide with the time of the end of the illumination t5. Alternatively, it is possible to wait for a short time between the end of the illumination and the beginning of the measurement. Furthermore, it is possible to begin the measurement before the end of the illumination. In this respect, however, it should be noted that the voltage in a typical a-Si defect at the beginning of measurement should already have dropped sufficiently compared with the voltage at the defect-free TFT.

FIG. 11 shows a slight modification of the method described in FIG. 9 which consists in that instead of a short light pulse, the optoelectronic module is continuously illuminated by the second source. For the driving process this means no or no substantial difference compared to the method from FIG. 9. At time t3 the pixel is driven and lies at a certain voltage. The light from the second source illuminates the pixel so that the amorphous silicon herein is conducting and voltage can drain off. As has already been mentioned, defects of amorphous silicon thus become conducting and result in a voltage drop. In addition, although to a lesser extent, the increased conductivity of the amorphous silicon in the transistor caused by the light results in a voltage drop over the transistor. These two factors should be taken into account in the choice of times t6 and t7. This is because: a sufficiently long time interval must lie between t3 and t7 so that voltage can decay via the amorphous silicon defects. This means that the measurement cannot be initiated directly after the driving since in this case, some amorphous silicon defects could not yet be made visible because the voltage takes a certain time to decay. At the same time, the time interval between the end of driving (t3) and the beginning of the measurement (t6) must not be selected to be too long since in this case, voltage would decay not only in the defective pixels but also in the defect-free pixels and specifically via the amorphous silicon in the thin film transistors. In general, by the end of the measurement process defect-free pixels should not have lost more than a maximum of 10% or a maximum of 20-30% of the originally applied voltage.

In addition, the measurement time interval in the embodiment from FIG. 11 is shown as limited by the time t7. This is therefore obtained by the light of the second source remaining switched on during the entire measurement. The amorphous silicon is therefore conductive during the measurement such that the voltage of the pixels can drain continuously via the (defect-free) transistors. From the time t7 or shortly thereafter, it is therefore no longer possible to distinguish in the measurement whether the measured voltage drop was actually caused by a defect or by defect-free transistors. A refresh must therefore take place at this time and the entire procedure from FIG. 11, for example, must be repeated. The time interval in which measurements can be made in the case of a continuously illuminating second source is generally substantially shorter that the time interval available for the measurement when the illumination is switched off in the measurement time interval. Substantially shorter is understood as time differences of at least one order of magnitude. The time interval available for the measurement according to the embodiment described in FIG. 11 is, for example, a maximum of 50-80 ms. If the measurement is continued thereafter it is barely possible to distinguish defective pixels from defect-free ones. The testing method shown as an example in FIG. 9 which merely irradiates the optoelectronic module with a short light dose before the measurement therefore generally requires fewer refresh cycles than the test method in which constant illumination takes place. In addition, longer waiting times can be selected between driving (t3) and measurement (t6). This has the advantage that defects which merely result in a slow voltage drop can also be detected.

FIG. 12 shows the voltage drop in the TFT and in the a-Si defect in the embodiment from FIG. 11 where the illumination is switched on before, during and after the measurement. The voltage V0 present at the TFT and at the a-Si defect after driving drops significantly in a comparatively shorter time in the a-Si defect as a result of the illumination whereas in the TFT this proceeds more slowly. As a result of the persistent illumination however, the voltage drop in the TFT is significantly more marked compared with the situation in which the illumination is switched off again after a short time. The time window in which a measurement can be made is defined by [t6; t7]. In this time interval, the voltage at a defect-free pixel can still be sufficiently clearly distinguished from the voltage at a pixel having an amorphous silicon defect. After t7 however, the voltage drop in a defect-free pixel is so strong as a result of the leakage current in the TFT, which is substantially more marked as a result of the illumination than the leakage current through an unilluminated TFT that defects and defect-free pixels can no longer be distinguished with sufficient certainty. A refresh must take place before testing is continued.

The measurement is explained hereinafter using an electron beam microscope as an example. Firstly, the pixels are set to a certain voltage using a method described in FIGS. 9 and 11. Typically, all the pixels are set to the same voltage such as, for example, +/−5 V or +/−15 V. Alternatively to this, it is also possible for the pixels to be alternately set to a positive and a negative voltage. In this case, it is additionally possible to locate defects as a result of which leakage currents appear between two neighbouring pixels. For example, all even-numbered pixels in a series can be driven at +10 V whereas all odd-numbers pixels in the series are driven at −10 V. In this case, it is logical to place all odd-numbered pixels in the neighbouring row at −10 V and all even-numbered pixels at +10 V. It is hereby achieved that the four nearest neighbours of each pixel have an opposite voltage compared to that of the pixel itself.

The optoelectronic module is divided into a plurality of test areas to be tested depending on the size and deflection possibilities inside the electron beam microscope. The movement system of the platform allows the optoelectronic module to be moved in such a manner that the different test areas can be accessed by means of the movement system. During the testing of a test area, the movement system is at rest: the pixels are driven by means of the deflectors built into the electron beam microscope. Typically, the beam can be deflected both in the x-direction and also in the y-direction. The x-y plane is defined as the plane perpendicular to the optic axis of the electron beam microscope. The electron beam is guided per pixel for a certain time interval onto this pixel. The secondary particles, typically secondary electrons, are measured, in which case spectroscopic means or energy filters such as, for example, a grid set to a potential are normally provided in front of the detector. The secondary particles typically leave the optoelectronic module with an energy composed of two components. The first component is obtained from the typical energy distribution of emitted secondary particles for the material to be tested. The second component is obtained from the voltage in the pixel. If this is negative, this results in an increased energy of the secondary particles. If this is positive, the energies of the secondary particles are lower than those according to the typical energy distribution of secondary electrons on the material to be tested. For example, if the voltage as a result of a defect is 0 or close to 0, the total energy substantially corresponds to the energy from the first component.

The measured data are typically evaluated in a comparison algorithm for all pixels. For example, if all the pixels are set to −15 V during driving and the measurement takes place until a maximum of 10% of the voltage has already dropped in the defect-free pixels, this means that the secondary electrons emitted by defect-free pixels comprise at least 13.5 eV. Typically, they have energies of up to about 25 eV, the energies being composed of the two aforesaid components. In this example, in addition to the energy distribution with energies up to 10 eV typical of these secondary electrons, these secondary electrons acquire an additional energy of 13.5 eV=15 eV at defect-free pixels which is caused by the applied negative voltage. Pixels in which the voltage has dropped to, for example, 60% of the original voltage as a result of an amorphous silicon defect, are defective and should be able to be detected as such. In this example with 60%, the resulting voltage in the defective pixel is −9 V. The grid mounted before the detector is, for example, set to a voltage of −15 V. This means that almost all the secondary particles emitted by defect-free pixels reach the detector and are detected there. However, for the most part the secondary particles emitted by the defective pixel which still has a voltage of −9 V cannot overcome the counter-potential of −15 V. More accurately, only those secondary particles from the defective pixel having at least 6 eV as a result of their first energy component reach the detector. This results in a significant different in the detector results between defect-free pixels and defective pixels.

The number of measured secondary elements per pixel can be represented visually. A high number can be represented as a light point, a comparatively low number can be represented as a dark point. Comparatively low means compared to the number that was measured at the pixels in the immediate proximity or the total area to be tested. FIG. 13 shows such a visual representation. The reference numbers 41-45 relate to different measurement results of a measurement on the same test area of an optoelectronic module where the dose of light which was directed onto the optoelectronic module before measurement varied. In the measurement result designated by 41, only slight differences in brightness can be identified. The light dose emitted before the measured was 0 lxs, i.e. no illumination took place before the measurement. As a result, the amorphous silicon defect was not conductive; it cannot be detected. The light dose in the second measurement, the result being designated by the number 42, was 6.5 lxs. The amorphous silicon defect 107 is already visible since significantly fewer secondary electrons could be measured here. The difference in the measurement result 43 which was measured in a measurement at 13 lxs is even clearer. However, the contrast between defect-free and defective pixels begins to drop with further increasing light dose. Thus, the measurement with the measurement result 44 was carried out with a preceding light dose of 32.5 lxs and the measurement with the measurement result 45 was carried out with a preceding light dose of 65 lxs. The comparatively higher light dose has the result that the number of secondary electrons emitted by defect-free pixels also drops. The contrast between defect-free and defective pixels is reduced with increasing light dose.

Typically, the number of secondary electrons emitted by a pixel is related to an average value which is composed of the corresponding number of secondary electrons emitted by the neighbouring pixels. Small areas with, for example, 4×4, 8×8 or 10×10 pixels are typically used as the initial basis for calculating the average value. Thus, the comparison can always be made locally with the neighbouring pixels. In this case, it is usual to compare not the measured numbers of pixels but a normalised detector value. In one exemplary embodiment a normalised average detector value can, for example, be 120. If the normalised detector value of a pixel deviates from this such that it exceeds a previously defined limit, this pixel is considered to be defective. Typical limits are between 20% and 40%, in particular 30%. Thus, if a deviation of more than +/−30% can be determined in one pixel in the present example, i.e. if the normalised detector value for this pixel is less than 120*0.7=84 or greater than 120*1.3=156, this pixel is classified as defective. In other words, if the ratio of the normalised detector value of a pixel to the normalised average detector value is between 0.7 and 1.3, the corresponding pixel is classified as defect-free. If the ratio is below 0.7 or above 1.3, the pixel is classified as defective. This information is stored in each case.

If the optoelectronic module is illuminated too long before the measurement, a significant voltage drop has already occurred everywhere, i.e. in the defect-free pixels. The normalised average detector value is, for example, 70. The normalised detector value of the defective pixel is, for example, 60. The defective pixel can thus no longer be classified as defective since the difference from the defect-free pixel has become too small. The measurement can only be continued after another refresh.

The representation of the measurement method was merely an example to increase the clarity of the present application. This must in no way be understood as limiting. In principle, voltages of all possible magnitudes can be and are generally applied to the pixels and the spectroscopic means mounted before the detector. These can also differ by orders of magnitude of the voltage in the measurement example described above.

The invention claimed is:

1. A device for testing an optoelectronic module, comprising:
 a first source for generating an electromagnetic beam or particle beam;
 a second source for illuminating the optoelectronic module;
 a detector; and
 a control unit of the second source for switching on and switching off the second source and completing the illumination for the optoelectronic module before directing the electromagnetic or particle beam, wherein the control unit controls the second source to illuminate the optoelectronic module before the measurement of the defects for an illumination period between 100 µs and 0.5 s.

2. The device according to claim 1, wherein the first source is used to generate test results and the second source is used to make a defect measurable.

3. The device according to claim 1, wherein the second source is formed and positioned in such a manner that the illumination incident on the optoelectronic module has a substantially homogeneous intensity within a region comprising a plurality of pixels of the optoelectronic module.

4. The device according to claim 1, wherein the second source comprises at least one LED.

5. The device according to claim 1, wherein the optoelectronic module comprises silicon and/or amorphous silicon.

6. The device according to claim 1, wherein the optoelectronic module is the base plate of a screen, wherein the base plate comprises a plurality of thin-film transistors, a plurality of electrodes and a plurality of capacitors.

7. The device according to claim 1, wherein the second source is located one of above the optoelectronic module or underneath the optoelectronic module.

8. The device according to claim 1, further comprising a test unit with contacts for electrically contacting the device with contact elements applied to the optoelectronic module, the device further comprising an electrical circuit for generating electrical signals at the test unit.

9. The device according to claim 8, wherein the control unit of the second source synchronizes the second source with an electrical signal applied to the test unit.

10. The device according to claim 1, wherein the first source is a particle beam source for generating a particle beam and wherein the beam from the first source is used to generate secondary particles which are measured by the detector.

11. The device according to claim 1, comprising a platform for holding the optoelectronic module, wherein the second source is arranged under a platform for carrying the optoelectronic module.

12. The device according to claim 1, wherein the second source provides red light from the visible spectrum.

13. The device according to claim 1, further comprising an electrical measuring circuit for measuring the voltage stored in pixels of the optical module, wherein the electrical measuring circuit is connected to the contact elements of the optoelectronic module.

14. A method for testing an optoelectronic module comprising:
 illuminating the optoelectronic module for an illumination period between 100 µs and 0.5 s;
 directing an electromagnetic beam or particle beam onto the optoelectronic module, wherein illuminating the optoelectronic module is completed before directing the electromagnetic or particle beam;
 applying a voltage to the optoelectronic module; and
 detecting defects in the optoelectronic module.

15. The method according to claim 14, wherein the electromagnetic beam or particle beam is generated by a first source and the illuminating is performed using a second source.

16. The method according to claim 14, wherein the optoelectronic module comprises thin-film transistors and the detecting only takes place within a time interval in which the voltage at defect-free thin-film transistors of the optoelectronic module has dropped by no more than 40% of the previously applied voltage.

17. The method according to claim 14, further comprising the step of measuring the voltage at a plurality of pixels of the optoelectronic module wherein an average voltage is calculated on the basis of the measured results of the voltage at the plurality of pixels and the measurement of the voltage of each pixel is compared with the average voltage, wherein a pixel is classified as defective if the measured voltage deviates by more than a limiting percentage from the average voltage.

18. The method according to claim 14, wherein the illuminating takes place before and during the alignment of the beam and/or before and during the detecting.

19. The method according to claim 14, wherein the illuminating only takes place for a time interval at which the voltage at a defect-free thin-film transistor of the optoelectronic module has dropped by no more than 20% of the previously applied voltage.

20. The method according to claim 14, wherein the illuminating of the optoelectronic module precedes the directing of the beam and the illumination is completed before directing the beam.

21. The method according to claim 14, wherein the illuminating is carried out in such a manner that the illumination incident within a region comprising a plurality of pixels of the optoelectronic module is substantially homogeneous.

22. The method according to claim 14, wherein a driving is executed by applying a voltage to the optoelectronic module and wherein a waiting time lies between the driving and the detecting.

23. The method according to claim 14, wherein the illuminating takes place in such a manner that the illuminating intensity on the optoelectronic module is about 500-1,500 1×.

24. The method according to claim 14, wherein the detecting comprises measuring secondary electrons which are generated by an electron beam at the optoelectronic module; and wherein the testing takes place in a vacuum chamber.

* * * * *